Aug. 8, 1939.  H. JUNGHANS  2,168,483
PHOTOGRAPHIC SHUTTER
Filed Feb. 24, 1937
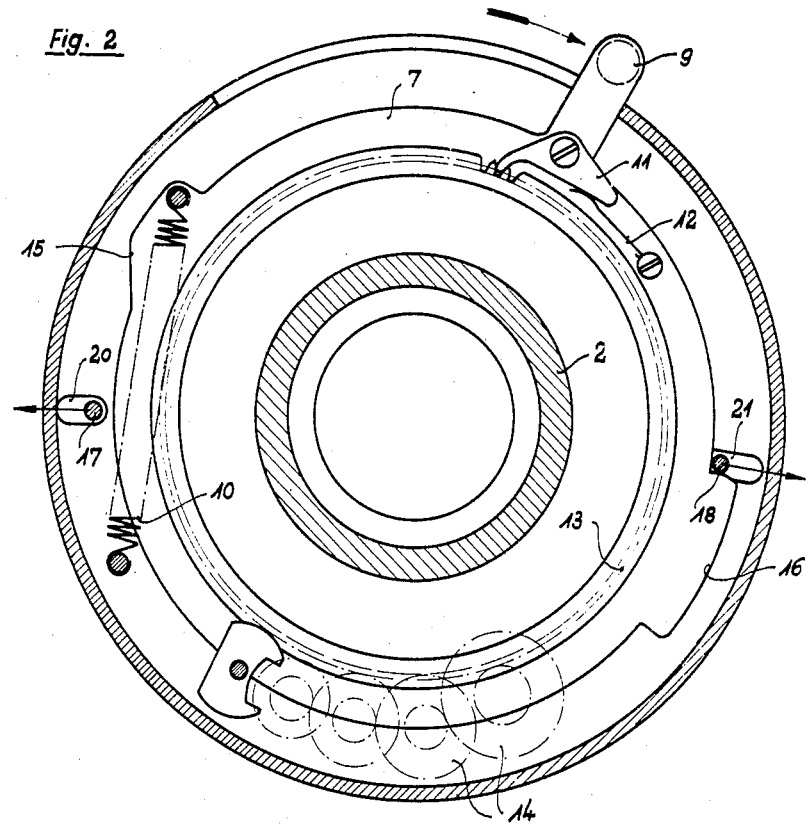
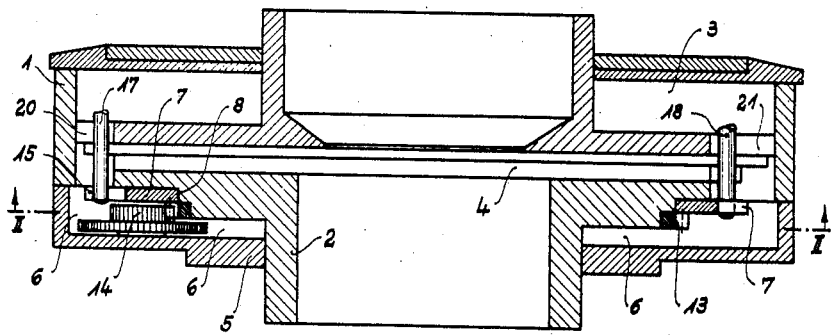
Inventor:
Helmut Junghans
By Young, Emery & Thompson
Attorneys Patented Aug. 8, 1939

2,168,483

UNITED STATES PATENT OFFICE 2,168,483

PHOTOGRAPHIC SHUTTER

Helmut Junghans, Schramberg-Sulgen, Wurtemberg, Germany

Application February 24, 1937, Serial No. 127,548
In Germany February 29, 1936

2 Claims. (Cl. 95—62)

This invention relates to a photographic shutter having a built-in timing mechanism for delaying the beginning of an exposure which is provided in a casing coaxial to the shutter casing.

The invention relates to a photographic shutter with built-in exposure timing mechanism which is arranged in a drum-shaped casing and is mounted on a rearwardly extending central socket or annulus on the shutter casing. A ring serves to wind up the timing mechanism and to release the shutter. The invention consists in that the said ring is arranged inside the exposure timing mechanism casing and is in communication through small openings in the partition between the shutter casing and the timing mechanism casing, with the shutter mechanism.

According to a further feature of the invention there is provided a toothed ring or annulus which is in constant engagement with the exposure timing mechanism and is mounted coaxially to the said tensioning ring, which toothed ring is driven from the winding ring by means of a pawl.

The present invention is an improvement of the photographic shutter with built-in exposure timing mechanism according to German Patent No. 614,834. In the prior construction the winding ring serving to wind up the exposure timing mechanism and to release the shutter, is arranged surrounding the periphery of the shutter casing and the exposure timing mechanism casing, for connecting and closure purposes. The manufacture of this ring is extremely difficult and expensive. Particularly the internal teeth on the ring for driving the timing mechanism causes great difficulty in manufacture. As compared with this prior mechanism the arrangement of the ring inside the drum-shaped timing mechanism casing is advantageous in several respects. First, the manufacture of the flat ring is simple. Then the shutter and exposure timing mechanism casings have no openings in their peripheries, it being only the partition between the two casings which is perforated at two places and over a small area for the passage of the releasing members for the shutter and exposure timing mechanism. This circumstance is of great advantage since the arrangement of the exposure timing mechanism in the separate casing which can be mounted from the rear on the shutter casing according to German Patent No. 614,834, makes possible a single constructional form of the shutter mechanism which may be provided with or without an exposure timing mechanism as desired. By arranging the ring for winding the exposure timing mechanism and for releasing the shutter mechanism, in the exposure timing mechanism casing, then when the timing mechanism is omitted (together with the ring) there is the advantage that it is only necessary to seal the small openings in the back wall of the shutter casing, after removing the releasing elements for the pre-timing mechanism and the parts cooperating with the ring of the releasing mechanism.

A possible form of embodiment of the invention is illustrated diagrammatically in the accompanying drawing, in which Fig. 1 is an axial secton taken through the entire shutter, Fig. 2 being a section along the line II—II in Fig. 1.

The shutter casing member or main casing 1, which is furnished at the rear with a central socket or annulus 2, comprises at the front the space 3 for the shutter mechanism and at the centre the space 4 for the diaphragm and the laminations. On the socket or annulus 2 there is mounted the drum-like rear casing member 5, which contains the exposure or timing mechanism 14 in the space 6. Within this space 6 there is also provided the flat revoluble ring 7, which serves to wind up the exposure or timing mechanism and to actuate the shutter. In the example shown it is constructed as a disc and is mounted over an annular projection 8, which is coaxial to the lens support. This ring 7 is furnished outside of the main casing member 1 with a stud 9, and is driven in the usual fashion by a spring 10. The ring 7 is also furnished with an engaging pawl 11. It is acted upon by a spring 12 and co-operates with the toothed ring or rack 13. This rack is mounted to be rotatable on the annulus or socket 2, and in turn engages with the exposure or timing mechanism 14. According to the invention, the pawl 11 is so arranged that in the winding direction of the ring 7 (compare the arrow leading from the stud 9) it rides over the teeth of the ring or rack 13. In the operating direction, however, it engages with the teeth and establishes a rigid connection between the ring 7 and the exposure or timing mechanism (Fig. 2).

The main member of casing 1 is furnished with two small openings 20 and 21 in a flange thereon. Through these openings there project two pins 17 and 18 into the path of movement of radial cam 15 and abutment 16 provided on the ring 7. The pin 18 causes the actuation of the exposure or timing mechanism. The pin 17, which is moved by the cam 15, serves to actuate the shutter mechanism.

The shutter mechanism being of known construction is not shown. As usual it comprises a spring casing with a winding lever. The spring casing actuates an escapement, and also the shutter diaphragm. Such a mechanism is shown in German Patent No. 614,834.

The mode of operation of the invention is as follows:

Before the exposure is made the operator first winds the spring of the shutter mechanism, not shown. Then he pushes the knob 9 in clockwise direction into the position of Fig. 2. By this operation the spring 10 is tensioned. Backward turning of the ring is prevented by the pin 18 which lies in front of the radial shoulder of abutment 16 on the ring 7. During the turning of the ring 7 the pawl 11 rides idly over the teeth of the rack 13. To begin the exposure, the pin 18 is moved radially outwardly by the operator by means of any easily accessible member mounted on the front of the shutter casing, the movement being in the direction of the arrow. This releases the ring 7 which turns in counter-clockwise direction. The pawl 11 engages the toothed ring or rack 13 and turns it also in counter-clockwise direction. As the ring 13 is in engagement with the timing mechanism 14, the rotation of the parts 7 and 13 is retarded.

The release of the shutter takes place at the end of the pre-set exposure time, by the oblique surface 15 of the ring 7 which encounters the pin 17 and moves it radially outwards. The shutter diaphragm is then moved in known manner by the shutter mechanism, not shown. In order to release the shutter mechanism use may be made, in well known manner, of the pin 17 actuated either from the front side or from the periphery of the shutter. This is not shown.

Having now particularly described and ascertained the nature of my said invention, and in what manner the same is to be performed, I declare that what I claim is:

1. In a photographic shutter with a built-in timing mechanism, a drum shaped casing comprising a main member and a rear member for said mechanism, a rearwardly extending central socket on the main member and coaxial therewith, a flat ring revolubly arranged inside said casing for winding up said timing mechanism, means for releasing the shutter, and another means for manually releasing the timing mechanism, a diametric partition on said main casing member, the means for releasing the shutter and said other means projecting through small openings provided in said partition between the casing and the timing mechanism, a cam on said flat ring for actuating the shutter releasing means, manual means for turning said flat ring, a spring associated with said flat ring adapted to turn the flat ring after tensioning by hand, an abutment on the flat ring situated behind said means for manually releasing the timing mechanism, means for transferring the flat ring rotation to said timing mechanism, upon tensioning said spring, and other means for preventing such rotation-transfer from the ring to the timing mechanism.

2. In a photographic shutter according to claim 1, in which said rotation transfer means consist of a toothed rack and a pawl, said rack being coaxial with the flat ring, and the pawl being pivotally mounted on the flat ring to cooperate and constantly contact with the teeth on the rack.

HELMUT JUNGHANS.